United States Patent

Strout, II et al.

[11] Patent Number: 5,339,415
[45] Date of Patent: Aug. 16, 1994

[54] DUAL LEVEL SCHEDULING OF PROCESSES TO MULTIPLE PARALLEL REGIONS OF A MULTI-THREADED PROGRAM ON A TIGHTLY COUPLED MULTIPROCESSOR COMPUTER SYSTEM

[75] Inventors: Robert E. Strout, II, Livermore, Calif.; George A. Spix, Eau Claire, Wis.; Jon A. Masamitsu; David M. Cox, both of Livermore, Calif.; Gregory G. Gaertner, Eau Claire, Wis.; Diane M. Wengelski, Eau Claire, Wis.; Keith J. Thompson, Eau Claire, Wis.

[73] Assignee: Cray Research, Inc., Eagan, Minn.

[21] Appl. No.: 973,598

[22] Filed: Nov. 9, 1992

Related U.S. Application Data

[63] Continuation of Ser. No. 571,955, Aug. 23, 1990, abandoned, which is a continuation-in-part of Ser. No. 537,466, Jun. 14, 1990, abandoned.

[51] Int. Cl.$^5$ .............................................. G06F 9/46
[52] U.S. Cl. .................... 395/650; 364/230.3; 364/245.7; 364/246; 364/281.4; 364/281.6; 364/281.7; 364/281.8; 364/DIG. 1
[58] Field of Search .............................. 395/650, 700

[56] References Cited

U.S. PATENT DOCUMENTS

| | | | |
|---|---|---|---|
| 4,631,674 | 12/1986 | Blandy | 395/700 |
| 4,636,942 | 1/1987 | Chen et al. | 364/200 |
| 4,829,422 | 5/1989 | Morton et al. | 364/200 |
| 5,050,070 | 9/1991 | Chastain et al. | 395/375 |
| 5,179,702 | 1/1993 | Spix et al. | 395/650 |

OTHER PUBLICATIONS

H. Jacobs, "User-Tunable Multiple Processor Scheduler", *Proc. Usenix Technical Conference*, pp. 183–192 (1986).

M. Chastain et al., "The Convex C240 Architecture", *Proc. Supercomputing Conf.*, pp. 320–329 (1988).

*Primary Examiner*—Gareth D. Shaw
*Assistant Examiner*—John Q. Chavis
*Attorney, Agent, or Firm*—Daniel J. Kluth

[57] ABSTRACT

On a tightly coupled multiprocessor computer system, the multiple parallel regions of a multithreaded applications program can execute simultaneously as multiple threads on a plurality of processors. Furthermore, a plurality of multithreaded programs may run simultaneously. The current invention uses an efficient system to schedule and reschedule processors to run these multiple threads. Scheduling is integrated at two levels: at the first level, processors are assigned processes. At the next level, processes are assigned threads. Increased efficiency is achieved by this integration and also by the formation of processes with destructible context. It makes use of shared storage to indicate the process request level and the control state for each parallel region.

4 Claims, 4 Drawing Sheets

DUAL LEVEL SCHEDULING OF PROCESSES TO MULTIPLE PARALLEL REGIONS OF A MULTI-THREADED PROGRAM ON A TIGHTLY COUPLED MULTIPROCESSOR COMPUTER SYSTEM

RELATED APPLICATIONS

This is a continuation of copending application Ser. No. 07/571,955, filed Aug. 23, 1990, and now abandoned, which is a continuation-in-part of a pending application filed in the United States Patent and Trademark Office on Jun. 11, 1990, titled INTEGRATED SOFTWARE ARCHITECTURE FOR A HIGHLY PARALLEL MULTIPROCESSOR SYSTEM, Ser. No. 07/537,466, and the invention described herein is suitable for use in the system environment of the copending application filed on Dec. 29, 1989, titled CLUSTER ARCHITECTURE FOR A HIGHLY PARALLEL SCALAR/VECTOR MULTIPROCESSOR SYSTEM, Ser. No. 07/459,083. Both of the aforementioned applications are assigned to the assignee of the present invention and are hereby incorporated by reference in the present application. This application is also related to co-pending application filed concurrently herewith, titled INTEGRATED HIERARCHICAL REPRESENTATION OF A COMPUTER PROGRAM FOR A SOFTWARE DEVELOPMENT SYSTEM, assigned to the assignee of the present invention, the disclosure of which is hereby incorporated by reference in the present application.

TECHNICAL FIELD

The present invention relates generally to multiprocessor computer systems and specifically to allocating processors in a tightly-coupled configuration to execute the threads of one or more multithreaded programs that are running on the system simultaneously.

BACKGROUND ART

The multiprocessing of a program has two stages: multithreading of a program and the simultaneous execution of the threads on multiple processors. Multithreading is the partitioning of a program into logically independent parts such that the parts can execute in parallel. A program can be multithreaded and still not achieve multiprocessing if all the threads of the program are executed on a single processor, for example, where only one processor is available. Multiprocessing of a program requires that threads of a multithreaded program execute simultaneously on different processors. Processes are entities that are scheduled by the operating system to run on processors. In a multithreaded program different processes would execute different threads in the program.

Consider an analogy. Suppose a farmer has a field that needs to be plowed. He writes orders for plowing of the field. Plowing the field is 10 days worth of work. If the farmer's orders instruct one worker to plow the field, the orders correspond to a single-threaded program (that is, a program that cannot be multiprocessed). If the farmer makes up ten sets of orders that each instruct one worker to plow 1/10th of the field, then the orders correspond to a multithreaded program.

In the analogy, workers correspond to the processes, tractors with plows correspond to the processors, and the foreman directing the workers corresponds to the operating system. The farmer has already divided the work into ten parts. If the foreman has only a single tractor available and gives a set of orders to a worker each day, plowing of the field will still require ten days. This is like running a multithreaded program on a single processor system. If the foreman has more than one tractor, he has the equivalent of a multiprocessor system. If he assigns several workers to plow simultaneously, he is multiprocessing the work.

The goal of multiprocessing is to reduce the execution time of a program. Execution time is the time between when a program is first submitted for execution and when the program finishes execution. Execution time is contrasted with central processing unit (CPU)-time or processor-time, which is the time that a program executes on a processor. For illustrative purposes, assume that there is only one program running on a multiprocessor system. Assume that program A requires ten hours to execute on a single processor. The CPU time for the program would be ten hours. If the program can be multithreaded into ten equal parts and executed simultaneously on ten different processors, then the execution time of the program will be about one hour.

The CPU time would remain approximately the same (ten hours) since each of the ten threads of the program would execute for one hour on each of ten processors for a total of ten hours. The CPU time would be approximately the same ten hours instead of exactly the same ten hours because there is always a cost or overhead for multiprocessing a program. A multithreaded program will require more instructions than the equivalent single threaded program. The additional instructions are required to start the execution of a thread, to synchronize the execution of a thread with other threads, and to terminate the execution of a thread.

The execution time for program A executing on ten processors will actually always be longer than one hour because of the overhead of multiprocessing as discussed above and because of the time required to schedule additional processors to help in the processing of program A. The time to schedule additional processors to help in the processing of a multithreaded program will be referred to as the gather time. If the gather time for a processor in this example is one second and each processor is gathered serially only once, then the execution time of program A will be one hour and ten seconds. A gather time for a processor of one second when the processors execute a thread that takes a one hour to execute is negligible. If the thread takes only one second to execute, the CPU time in this example would be ten seconds and the execution time would be ten seconds so that multiprocessing in this case would gain nothing and would in fact utilize nine additional processors for no gain. The gather time for processors thus has a direct bearing on the effectiveness of multiprocessing.

In terms of the analogy, assume the foreman has ten tractors and ten workers on the farm. The execution time starts when the foreman gets the orders from the farmer. The foreman must hand out the work assignments to each worker. The time required to make the work assignments is part of the overhead of multiprocessing. If, instead of one worker receiving instructions from the foreman, there are ten workers that must each be given instructions, the overhead is increased by a factor of ten. If handing out the assignments takes one minute for each man and each man will do a full day's worth of plowing, then the field will be plowed in one day and multiprocessing will be a success. If, instead of plowing, the job consists of moving 10 sacks of grain and it takes one minute to hand out the assignments but only one minute to move each sack, then multiprocessing the job would use ten men to no advantage.

If the foreman has no tractors on the farm and has to get them from other sites, then the time required to get each tractor to the farm (the gather time) has to be considered as part of the overhead. If each worker must spend 10 minutes fetching a tractor before he can begin the day's plowing, then multiprocessing is still reasonable. But if each worker has to spend a day to fetch a tractor in order to plow for a day, then multiprocessing is less reasonable.

As the discussion above indicates, a short gather time can make multiprocessing useful. "Short" is a relative term. If gather time is short relative to the amount of time that the gathered processors will spend processing, then multiprocessing is useful. A shorter gather time makes it profitable to multiprocess threads with smaller CPU times.

One method currently used to avoid the problem of a long gather time is to dedicate all the processors (or a fixed number of processors) of a multiprocessor system to the execution of each multithreaded program. Dedicating the processors to one multithreaded program means that the processors are always executing code in the program and do not have to be gathered from the operating system. The code that is executed in the program may be a thread of work or may be a loop in the program that looks for threads of work to execute. The loop that looks for threads of work in the program is referred to as a wait loop. If the processors spend much time in the wait loop, this is not an efficient use of processors. If the processors are an inexpensive resource, this may be acceptable. For a multiprocessor system where each processor is a high performance processor, it may not make economic sense to dedicate processors to a multithreaded program that may only use the processors a fraction of the total time they are available to it.

In terms of the analogy, the foreman can keep ten tractors standing by at the farm during the entire plowing season. If some fields are not ready for plowing, then some tractors wait idly. If the farmer is not paying much for the tractors, this may be acceptable but is hardly optimal.

In a typical Unix[1] system running on tightly-coupled multiprocessors, an additional processor can be gathered by creating a new process with a fork system call. The new process is created so that it can execute an available thread and is commonly referred to as a shared image process. It does not necessarily execute immediately but is scheduled through the normal Unix scheduling mechanism. It is a full context process. Building its context-information takes a significant amount of time.

[1]Unix is a registered trademark of AT&T Bell Laboratories.

An article entitled *The Convex C240 Architecture* by Chastain et al. (CH2617-9/88/0000/0321, 1988 IEEE at page 324 et seq.) describes the Convex Automatic Self-Scheduling Processors (ASAP) scheduling mechanism which provides one method for gathering processors. In the ASAP mechanism, an idle CPU (processor) is defined as a CPU which has no process context. The idle CPUs continually poll, searching for a process in need of compute power. A process indicates that it can use additional compute resource by executing a spawn instruction. Normal process scheduling utilizes the ASAP mechanism by having the Unix scheduler request an additional processor. The ASAP mechanism is a hardware implementation that uses the spawn instruction to request all idle CPUs.

An important problem with the ASAP mechanism is a potential for CPUs to respond to a request for additional compute power and find that there is no work to be done because other CPUs have taken all the work. This can waste CPU resources if CPUs spend a significant amount of time being gathered into processes where there is no work. A second problem is that, potentially, all idle CPUs will respond to a single spawn request as opposed to multiple spawn requests. If the same multithreaded program having different threads executes spawn instructions, the first thread to execute the spawn instruction may get all the idle CPUs (which may or may not be needed) and the CPUs would have to return to the idle state before they could respond to the second spawn instruction.

In terms of the analogy, the ASAP mechanism corresponds to having the foreman send up a signal when tractors are needed as opposed to sending workers out to fetch the tractors. An idle worker waits on each tractor, watching for the signal. When they see the signal, they all drive their tractors to the farm. When they get to the farm, they may find that there is not enough work to go around. The workers are idle. This is in contrast to workers who are plowing with the tractors. This distinction is made with the ASAP idle CPUs and with the microprocesses discussed later. If the tractor is being used for plowing on another farm, it could be used to respond to the signal by having the worker on the tractor (worker 1) get off the tractor, and another worker (worker 2) get on the tractor and respond to the signal. The switch of workers is done because worker 1 has orders to plow the current field and has to remember where to start plowing again when the tractor is returned. This part of the analogy is very close to the way an operating system schedules processes (the workers) to processors (the tractors). In other words, a tractor in use requires additional time to disengage from the current job before starting a new one. A feature of the idle CPU and the microprocess is that no time is spent on disengaging from the current job since there is no current job.

U.S. Pat. No. 4,631,674 to Blandy describes the IBM Active Wait mechanism which gathers processors from the operating system and then holds them for some period of time for later use. After a processor is finished executing the thread for which it was requested, it enters a wait loop. While it is in the wait loop, it scans queues for additional work that is ready for execution. The Active Wait mechanism is an effective way of assigning processes already in use by a program.

In the farm analogy, the Active Wait mechanism is concerned with workers that are already at the farm. If the workers are at the farm, they wait there for some period of time before going to other work sites. The advantage being that workers already at the farm can be gathered very quickly.

A method is needed for gathering processors for executing threads from different parts of a multithreaded program. The method needs to be efficient in the sense that a processor can be gathered quickly and that a sufficient number of processors is gathered. The method should also be flexible to allow for different strategies to be used during periods of different system loads.

SUMMARY OF INVENTION

It is an objective of process self scheduling, in accordance with the present invention, to provide an efficient and flexible method for gathering processors for executing the threads of a multithreaded program in tightly-coupled multiprocessor systems. To achieve this goal, the present invention implements the following steps.

When one or more threads become ready to execute, the number of microprocesses (microprocesses are described below) needed to execute those threads is added to a shared resource (a resource accessible by all processors in the tightly-coupled multiprocessor system). This resource will be referred to as the Gather Queue (GQ).

Processors that have finished executing threads in the multithreaded program will enter the User-Side Scheduler (USS). The USS scans the GQ for threads that are ready to execute. The USS will continue to scan the GQ for a system specified (user adjustable) period of time. Scanning is done at system specified (user adjustable) intervals to reduce contention on GQ. If no thread is found to execute, the processor will return to the operating system.

A microprocess is a process that has destructible context. Destructible context is context (information) that does not have to be saved from the processor before switching from the process it is currently executing to a new process. A processor executing a microprocess is therefore a processor that can quickly be applied to the execution of a thread of a multithreaded program. A microprocess can grow into a full context process as the result of an interrupt, fault, or some system calls. This growth into a full context process is delayed until it is required. Some system calls do not require a full context process and the servicing of those system calls leave the microprocess as a microprocess.

The operating system performs process scheduling. When a process is finished or is blocked (cannot continue execution without some external action), the operating system has the option of executing a microprocess in the processor that was previously executing the finished or blocked process. The operating system would choose to execute a microprocess in a processor for the purposes of making a processor available for executing threads in a multithreaded program. The microprocess selects a GQ for an executing multithreaded program and scans it looking for threads that are ready to execute in the same way that the USS scans the same GQ. These microprocesses and the USS can share the same code for scanning the GQ. The operating system will normally schedule microprocesses to processors for which there is not other work (idle processors). The operating system also has the option to always schedule some number of microprocesses to processors in order to better support multiprocessing of multithreaded programs.

It is not guaranteed that a request for a microprocess will be fulfilled. In the event that the USS wants to be guaranteed a process for executing a thread, it has the option to execute a shared image fork system call which will cause the operating system to create a full context process that will execute in the USS. The USS can then scan the GQ for a thread.

When a processor (either executing a microprocess or the USS) finds work in the GQ, it decrements the count in the GQ to indicate that it is servicing a request. The processor executing a microprocess assigns itself a pointer to processor private data area and a stack pointer. A separate stack pointer is needed for each processor in the event that a thread executes a procedure call requiring its own stack. The processors then execute additional code in the USS which scans a second queue which holds information about different sets of threads (referred to as the thread queue). A thread queue contains the number of threads that are available for execution and the context for executing each thread. This context includes the program counter, frame pointer, and argument pointer for the thread. These different sets of threads correspond to different parts of the program that have been multithreaded.

As mentioned above, the USS can return a processor executing a microprocess to the operating system for use on other threads from other multithreaded programs. Microprocesses can continue to execute threads from one or more multithreaded programs until they need system action that requires that they be turned into a full context process (system call or interrupts). Microprocesses can also be reclaimed by the operating system for use as full context processes.

Process self-scheduling in accordance with this invention provides an efficient and flexible method for scheduling processors to threads from the same or different parts of a multithreaded program.

The fastest method for gathering a processor to work on a thread is to immediately reassign a processor that has finished its current thread via the USS to a new thread. This first method is most useful when there are many threads to execute and there are already processors executing threads in the multithreaded program.

The second fastest method for gathering processors is to request a microprocess. It is most useful when the number of threads increases and new processors can be profitably used. This method is not guaranteed to obtain a processor but has a good probability of doing so if there are idle processors in the system, if the priority of the requesting process is sufficiently high, or if the OS has administratively decided to guarantee some processors are always available for multiprocessing.

A third method is the fork system call which will always provide a processor but at the highest overhead. This method is useful when the total amount of work is large (a thread with a large amount of work or many threads with small or medium amounts of work). The additional processor is guaranteed to eventually be made available for executing threads.

Those of ordinary skill in the art will recognize the foregoing and other objects, features, advantages, and applications of the present invention from the following more detailed description of the preferred embodiments as illustrated in the accompanying drawings.

DESCRIPTION OF PREFERRED EMBODIMENT

Figure 1:
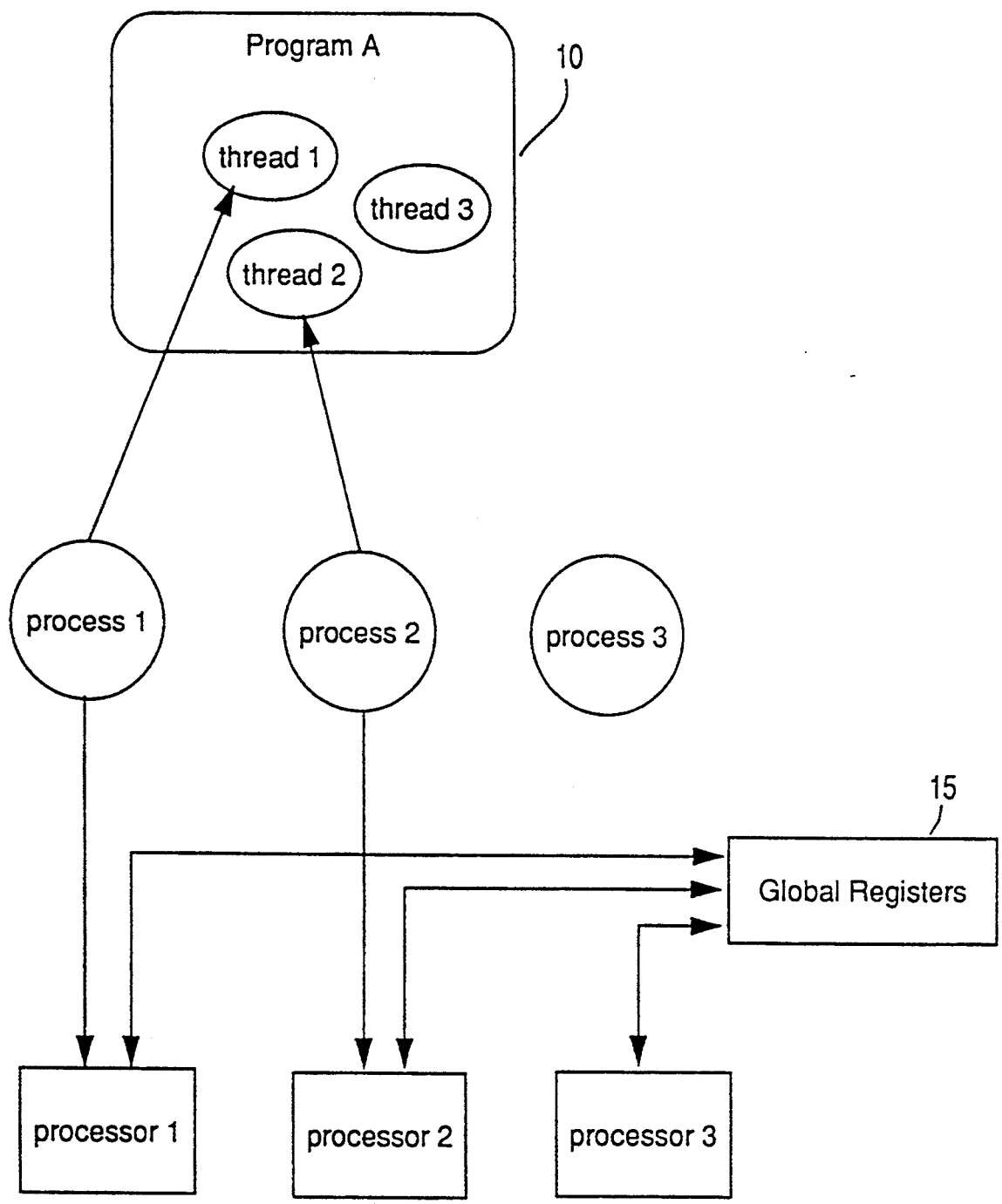
FIG. 1 is a diagram of processors and processes executing a multithreaded program.

FIG. 1 illustrates the multiprocessing model used in the current invention. Program A represented by block 10 has been multithreaded. This means that separate threads have been created in the program. A thread is a sequence of instructions and the data used by the instructions that can be executed independently from other threads. If the processes executing the different threads of a program are scheduled to execute simultaneously on different processors, then multiprocessing of the multithreaded program is achieved. In FIG. 1, process 1 is executing thread 1 on processor 1, and process 2 is executing thread 2 on processor 2. They are multiprocessing two threads of a program.

The preferred embodiment is implemented on the multithreaded operating system (mOS) on the tightly-coupled processors of a multiprocessor computer system. The preferred embodiment of the multithreaded operating system (mOS) and the tightly-coupled processors of the multiprocessor computer system are described in greater detail in the related patent application INTEGRATED SOFTWARE FOR A HIGHLY PARALLEL MULTIPROCESSOR SYSTEM, Ser. No. 07/537,466. The software mechanism described in this application is hereafter referred to as process self scheduling.

The system environment implementing the preferred embodiment has a set of global registers 15 that may be shared by all processors. The sharing of the global registers 15 is determined by values in the GMASK and GOFFSET control registers of each processor. The GMASK and GOFFSET control registers are writable only by the mOS. The global registers 15 have the associated atomic operations of fetch-and-add, test-and-set, conditional fetch-and-add, and swap. The preferred embodiment uses the global registers 15 for synchronization and sharing data.

In the following discussion, a thread is a logical piece of work that can be executed simultaneously with other threads. A process is the code, data, register context, I/O context, and mOS process tables associated with a program that can be scheduled by the mOS for execution in a processor. A process can sequentially execute threads. Threads are scheduled by the USS and the mOS is not aware of threads. A process is executed by a processor.

Figure 2:
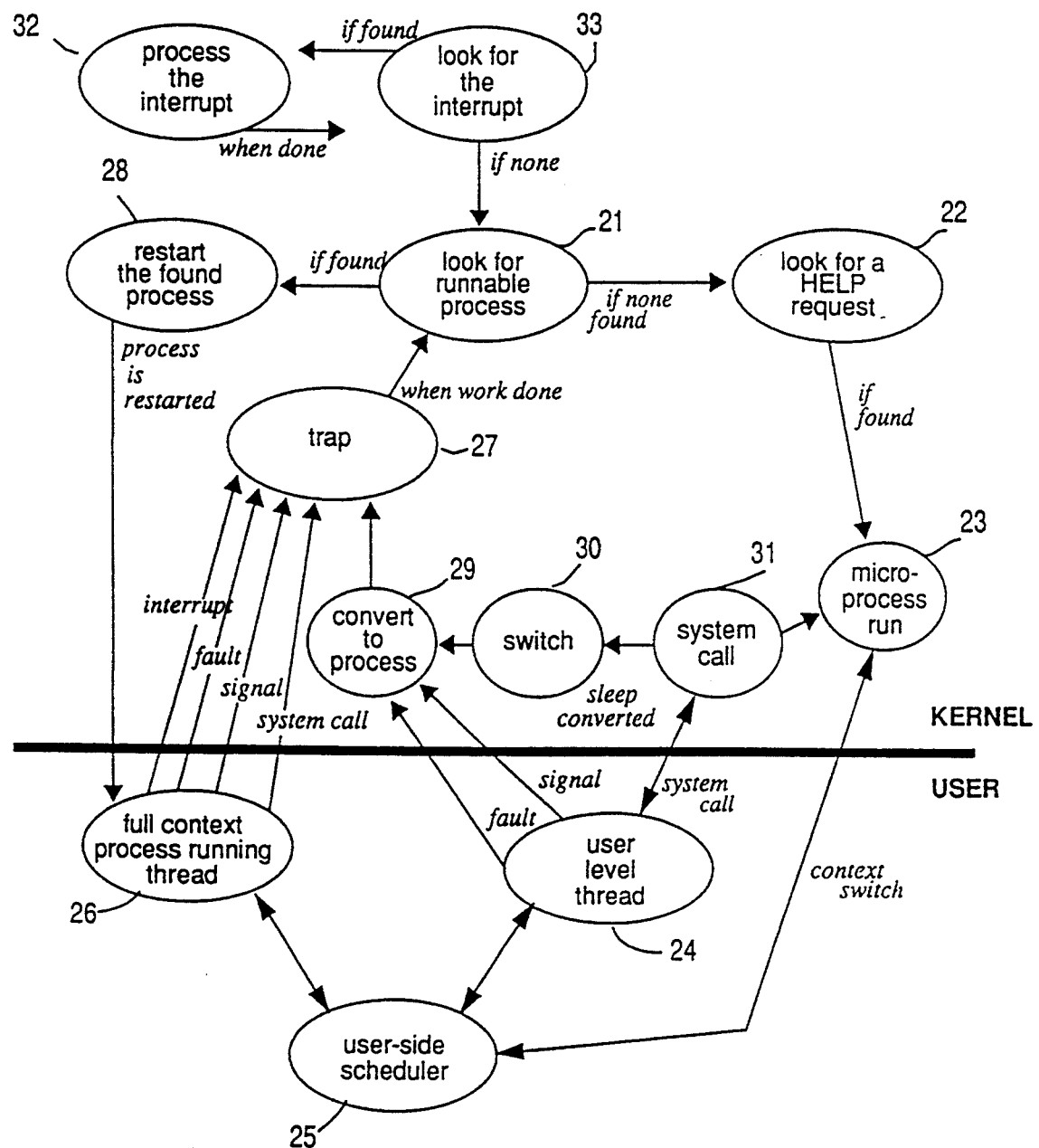
FIG. 2 is a state diagram for a process in the mOS and the User-Side Scheduler.

FIG. 2 shows the different states of a process in the mOS. The area denoted as the "kernel" is a UNIX operating system (OS) term meaning the part of the system that provides the basic systems services. For example, the kernel creates and manages processes and provides functions to access the file system and communication facilities. In addition, within both the user environment and the kernel the states identified by reference numerals 21, 26, 27, 28, 32, and 33 are all standard in UNIX.

At state 21, the mOS is looking for a user process to execute. The mOS will nominally look for a full context process from its queue of ready processes. If it does not find a ready process to execute, it will check the HELP requests in state 22 for computational help for multiprocessing multithreaded programs. As a site option, a number of processors can always be made available for multiprocessing. This can be done by having the mOS keep track of how many processors are checking for HELP requests prior to scheduling a full context process. If the site set minimum number of processors are not checking for help requests, then the mOS can preferably schedule a processor to look for HELP requests before scheduling a full context process.

A process requests help by doing a fetch-and-add of the number of additional microprocesses it wants to the value in a global register 15. The particular global register 15 is chosen by convention. In this discussion, that register will be referred to as g[HELP]. The context of a processor checking for HELP requests is destructible at this point. This means that the context of the process does not have to be saved for later use and thus may be discarded. This reduces the time needed to make a processor available for multiprocessing of a multithreaded program. A processor in state 22 checks for a positive non-zero value in g[HELP] corresponding to the different executing shared image process groups. A shared image process group is a set of processes that share the same set of global registers 15. If a positive value is found in g[HELP], a fetch-and-add of $-1$ is done on g[HELP]. If the operation is successful, then the processor claims for itself one request for a microprocess.

A process being executed in state 22 has a destructible context and is designated a microprocess. A microprocess is a process in the mOS that does not have a complete representation. For example a microprocess has a minimal process table entry and no independent user block entry. The contents of the minimal process table entry will be sufficient to allow the mOS to respond to system calls from the microprocess, although it will not be sufficient to allow completion of all system calls, and will contain sufficient information to map the parent process image to the microprocess. The minimal process table entries are pre-allocated to minimize microprocess start-up time. Microprocesses respond to requests for system action as indicated below. A microprocess that is responding to HELP requests executes the USS in state 25. The operation of the USS is discussed below. The USS schedules threads into both full context processes (transitions between states 25 and 26) and microprocesses (transitions between states 25 and 24).

A microprocess that is executing a thread may execute system calls. Some system calls may require that the microprocess be expanded into a full context process. This is indicated by the transition through states 31, 30, 29 to 27. Some system calls may be serviced without changing the microprocess to a full context process and those are shown as a transition to state 31 and then back to state 24. The execution of a fault or signal by a thread in a microprocess requires conversion to a full context process as indicated by the transition to state 29 and through to state 27. The mOS notes that the microprocess is not a full context process when a fault or signal is executed and proceeds to convert it to a full context process. This requires expansion of the system tables to hold the information for the context for the new process. The full context process then joins other full context processes for normal process scheduling.

As mentioned, full context processes executing a thread in a multithreaded program will return to the USS upon completion of its thread for scheduling of a new thread. Note that the USS is code that is embedded in each multithreaded program. The USS is described more fully below.

The use of the fork system call to gather a processor is not shown specifically. That situation is under the control of the user (the USS is not involved). A process (either a full context process or microprocess) would make a fork system call. The mOS would create a new full context shared image process and the new process would be scheduled through states 21 and 28. The new process would start execution at the point of the fork system call and would execute according to the user's code. Normally the user's code will determine by the return value of the fork system call that it is a new process and execute based on that knowledge.

Figure 3:
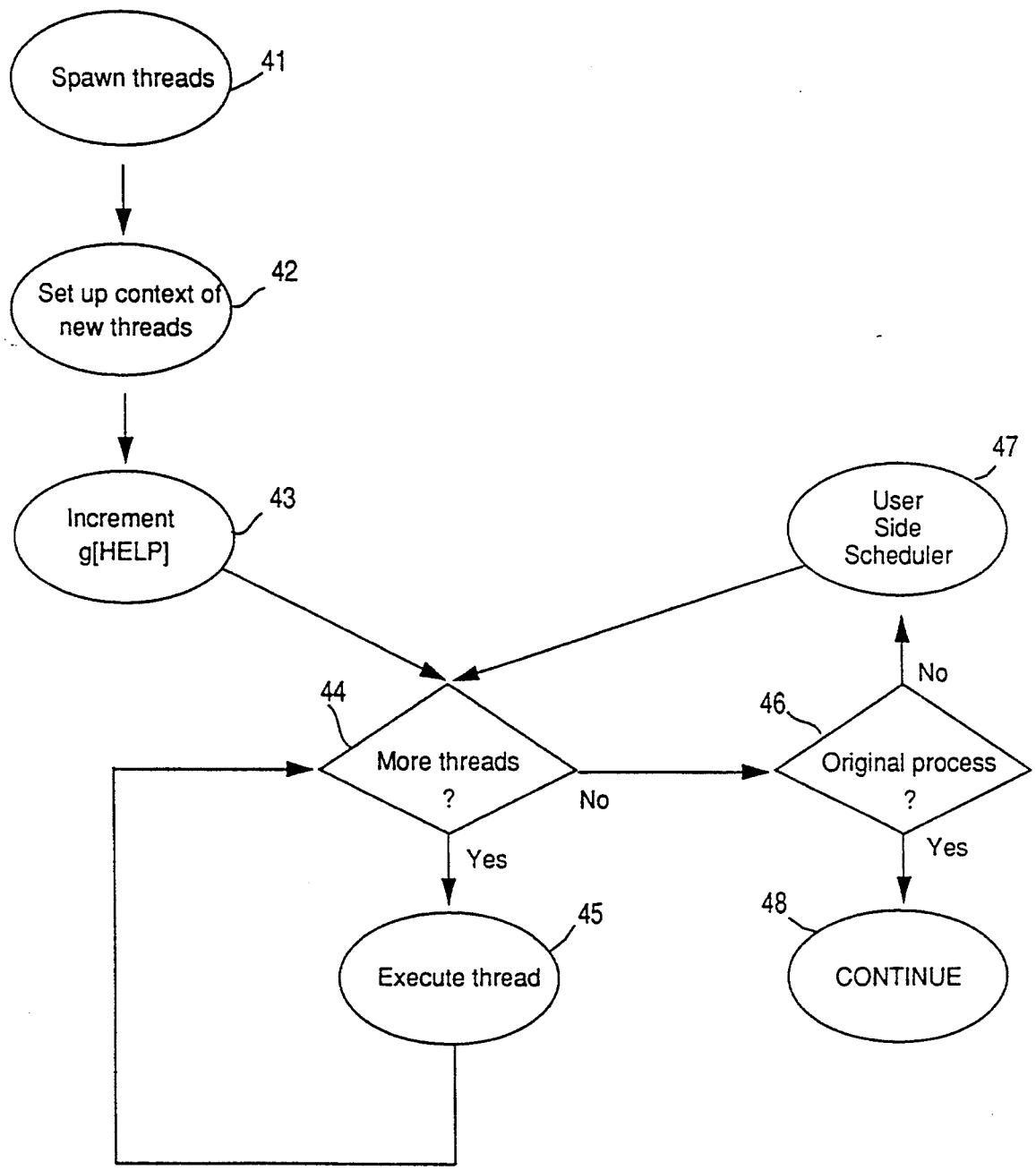
FIG. 3 is a flow chart showing the spawning and execution of a thread.

FIG. 3 shows the steps in creating and executing new threads. Step 41 is the starting point in a multithreaded program where code has been inserted for the creation of additional threads. In this step, the code searches for an available set of global registers to be used for this multithreaded region of the program from a free list of sets of global registers. Each multithreaded region requires its own set of global registers. This set of global registers is shared by all the threads from that region. At step 42, the context for the new threads is stored into global registers for the region. The context for a thread consists of the program counter, return address, frame pointer, stack pointer, and number of threads to be created for this multithreaded region of the program. The particular global registers that are used are chosen by convention, that is, certain discrete global registers are selected to provide the functions of the program counter, return address, frame pointer, stack pointer, number of processors requested, and number of threads. In step 43, the help global register g[HELP] is incremented with the number of processors that are being requested for this region. This can be different from the number of threads created in the region.

After incrementing g[HELP], the process proceeds to step 44 where it claims one of the threads for execution by performing a conditional fetch-and-add of −1 on the threads global register. Additional processes may enter step 44 from the USS at 47 and, in fact, the process doing the spawn of the threads is not guaranteed a thread for execution. After executing its assigned thread, the process again tries to claim an additional thread for execution. If no more threads exist, the processes either return to the USS or continue with the execution of the program. The process that spawned the threads must continue since it is the process that contains the full context of the program prior to the point where the threads were spawned. The flow chart shows a decision at block 46 to send the spawning process on to continue execution of the program. The actual implementation has the USS set the return address global register to itself and the spawning process sets the return address global register to the end of the region. Not shown is the barrier at the end of the multithreaded region to guarantee that all threads have been executed before the spawning process exits the region.

Figure 4:
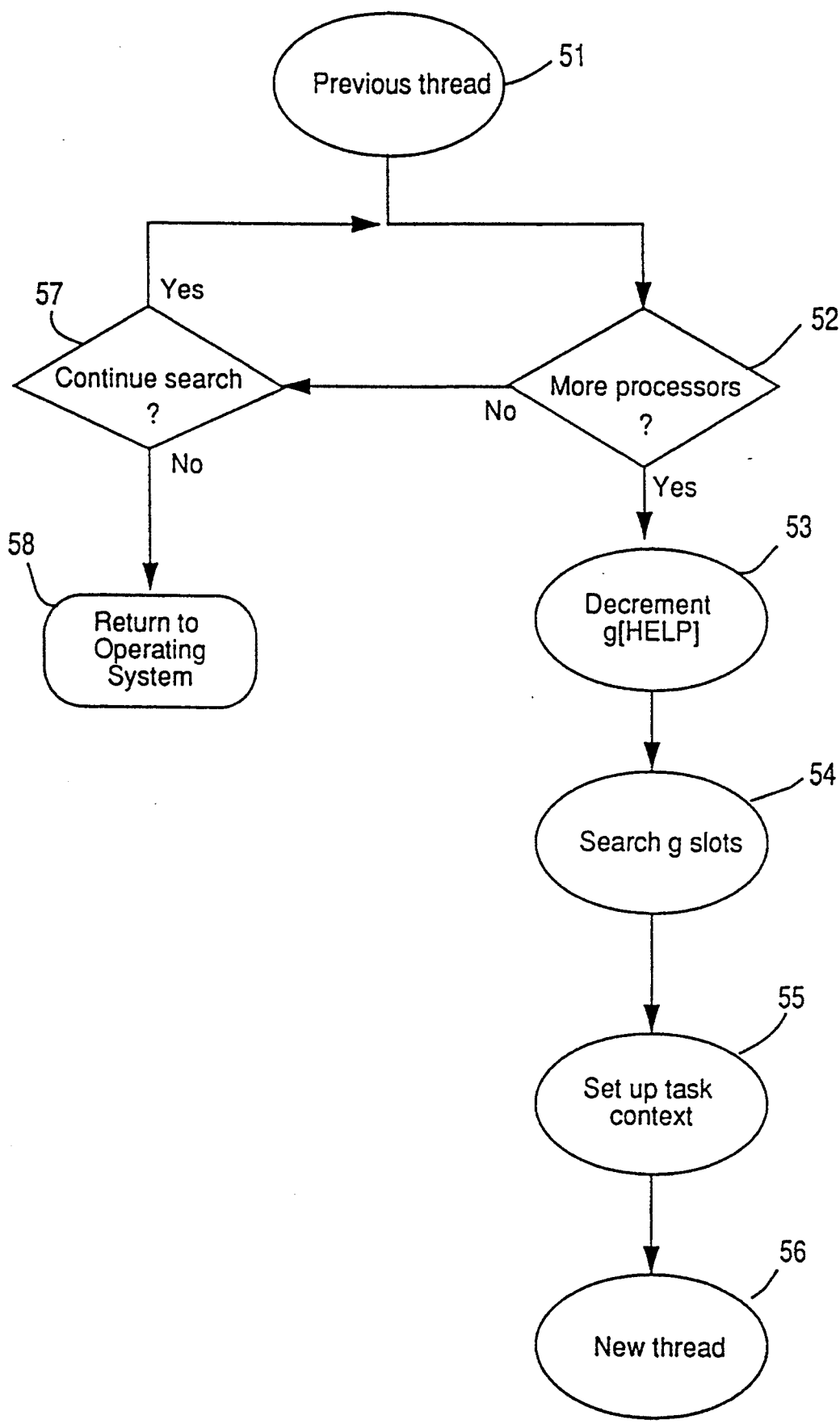
FIG. 4 is a flow chart of a process being assigned threads by the user-side scheduler.

FIG. 4 shows the steps in the USS for scheduling a process to a thread. At step 51, a process has completed the execution of a thread and has returned to the USS. It checks for additional requests for help by checking g[HELP] at step 52 just as the mOS does when scheduling microprocesses. If a request is found, the process decrements g[HELP] to indicate that it is fulfilling a request for help at step 53. At step 54, it searches for work to be executed. This is done by searching the free list of global register sets for an allocated set or slot of global registers. There are available threads associated with each allocated slot. If an allocated slot is found, the register containing the count of the number of processor requests is checked to determine whether additional processors have been requested for this set of threads. If the register count is positive, a conditional fetch-and-add of −1 is done on the request register to fulfil a processor request. This may seem redundant since the g[HELP] register has already been checked but this gives additional control over the allocation of processors. For example, if there are eight threads to be executed, only four processors may be requested. In this situation, if seven processors joined in and executed threads at the same time, there would be one processor that still had to execute the eighth thread and the execution time would be the same as if only four processors had joined in the execution of the threads. The reason for requesting only four processors instead of eight relates to the amount of work in each thread. The overhead of getting a processor may be acceptable if each processor executes two threads but may not be acceptable if each processor executes a single thread. The process then takes the needed context for the thread from the global registers in its chosen slot at step 55 and sets the return address register to the USS (step 52). It then jumps to the new thread as shown in step 56.

If no thread is available at step 52, code is executed to decide whether to continue searching for a thread or not at step 57. This decision is based on how long the process has been searching for an available thread. This search length has a system set default value that can be modified by the user. If the search time is exceeded, the process returns to the OS for normal process scheduling. Not shown is a delay in the search loop. The delay is inserted to reduce the contention (and associated delay) for access to g[HELP].

While the exemplary preferred embodiments of the present invention are described herein with particularity, those having ordinary skill in the art will recognize various changes, modifications, additions, and applications other than those specifically mentioned herein without departing from the spirit of this invention.

What is claimed is:

1. In an operating system having a plurality of shared storage resources accessible by a plurality of processors for running a multithreaded program, a two level scheduling method of executing said multithreaded program, comprising the steps of:
   (a) assigning program threads of said multithreaded program to processes;
   (b) storing in a first shared storage resource context for executing said processes corresponding to said program threads;
   (c) queuing in a second shared storage resource a value representing the number of said program threads in said multithreaded program to be executed;
   (d) determining that a processor is available to execute a process having context stored in said first shared storage resource; and
   (e) scheduling said processes for execution by said processors, comprising the steps of:
      scanning by said available processor a queue in said second shared storage resource to respond to a positive value in said second shared storage resource;
      decrementing said second shared storage resource value using said available processor; and
      accessing contents of said first shared storage resource corresponding to said scan for initiating execution, using said available processor, of a process associated with accessed context.

2. The method according to claim 1 wherein said first shared storage resource includes a plurality of global registers sequentially accessible by a processor, and said storing step further includes the step of sequentially loading said plurality of global registers with information corresponding to the context of a process to run a thread.

3. The method according to claim 1 wherein said second shared storage resource is a global register, and the method includes a further step of returning an available processor to the operating system when said second shared storage resource contains a value of zero.

4. The method in accordance with claim 1 in which the operating system performs the steps of:
- scheduling a number of processors for executing said processes of said multithreaded program; and
- allowing only said scheduled number of processors to access said first and second shared storage resources.

* * * * *

UNITED STATES PATENT AND TRADEMARK OFFICE
CERTIFICATE OF CORRECTION

PATENT NO. : 5,339,415

DATED : August 16, 1994

INVENTOR(S) : Robert E. Strout, II et al.

It is certified that error appears in the above-indentified patent and that said Letters Patent is hereby corrected as shown below:

On the title page: Item [63]

Under Related U.S. Application Data, please delete "Jun. 14, 1990," and insert --Jun. 11, 1990,-- therefore.

Signed and Sealed this

Twenty-first Day of November, 1995

Attest:

BRUCE LEHMAN

*Attesting Officer*   *Commissioner of Patents and Trademarks*